(12) United States Patent
Sugaya

(10) Patent No.: US 10,895,491 B2
(45) Date of Patent: Jan. 19, 2021

(54) ANIMAL WEIGHT ESTIMATION SYSTEM, ANIMAL WEIGHT ESTIMATION METHOD, AND PROGRAM

(71) Applicant: OPTiM Corporation, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 58 days.

(21) Appl. No.: 16/306,651

(22) PCT Filed: Jun. 3, 2016

(86) PCT No.: PCT/JP2016/066602
§ 371 (c)(1),
(2) Date: Jan. 22, 2019

(87) PCT Pub. No.: WO2017/208436
PCT Pub. Date: Dec. 7, 2017

(65) Prior Publication Data
US 2019/0186981 A1 Jun. 20, 2019

(51) Int. Cl.
*G01G 17/08* (2006.01)
*G01B 11/24* (2006.01)

(52) U.S. Cl.
CPC ............ *G01G 17/08* (2013.01); *G01B 11/24* (2013.01)

(58) Field of Classification Search
CPC ................................. G01G 17/08; G01B 11/24
USPC .......................................................... 177/1
See application file for complete search history.

(56) References Cited

U.S. PATENT DOCUMENTS

| 2009/0101037 | A1 | 4/2009 | Suehira et al. | |
|---|---|---|---|---|
| 2010/0289879 | A1* | 11/2010 | Sinzinger | A01K 29/00 348/46 |
| 2012/0275659 | A1* | 11/2012 | Gomas | G06T 7/12 382/110 |
| 2013/0064432 | A1* | 3/2013 | Banhazi | G06T 7/60 382/110 |
| 2013/0322699 | A1* | 12/2013 | Spicola, Sr. | G01G 9/00 382/110 |
| 2014/0193043 | A1* | 7/2014 | Gomas | G06K 9/6214 382/110 |
| 2014/0323836 | A1* | 10/2014 | Kusukame | A61B 5/00 600/344 |

(Continued)

FOREIGN PATENT DOCUMENTS

| JP | 06-003181 | 1/1994 |
|---|---|---|
| JP | 11-153419 | 6/1999 |

(Continued)

*Primary Examiner* — Marrit Eyassu
(74) *Attorney, Agent, or Firm* — Lex IP Meister, PLLC

(57) ABSTRACT

It is an object to provide an animal weight estimation system, an animal weight estimation method, and a program, for suppressing increase of cost and improving safety when measuring a weight of an animal. An animal weight estimation system 1 for estimating a weight of an animal captures the animal, acquires outline data or a feature amount of the animal from a captured image which is captured, measures a distance between the animal and an image capturing position of the animal and estimates a weight of the animal from the acquired outline data and the measured distance when the outline data are acquired, and estimates the weight of the animal form the acquired feature amount when the feature amount is acquired.

8 Claims, 12 Drawing Sheets

(56) References Cited

U.S. PATENT DOCUMENTS

2015/0213305 A1* 7/2015 Sundstrom .............. G06F 16/00
  382/118
2016/0012278 A1* 1/2016 Banhazi ................. A01K 29/00
  382/110

FOREIGN PATENT DOCUMENTS

| JP | 2002-243527 | 8/2002 |
| JP | 2003-254810 | 9/2003 |
| JP | 2004-122086 | 4/2004 |
| JP | 2004-144727 | 5/2004 |
| JP | 2008-008889 | 1/2008 |
| JP | 2009-229239 | 10/2009 |
| JP | 2010-137096 | 6/2010 |
| JP | 2012-254565 | 12/2012 |
| JP | 2014-044078 | 3/2014 |
| WO | 2014/049984 | 4/2014 |

* cited by examiner

ANIMAL WEIGHT ESTIMATION SYSTEM, ANIMAL WEIGHT ESTIMATION METHOD, AND PROGRAM

TECHNICAL FIELD

The present invention relates to an animal weight estimation system, an animal weight estimation method, and a program for estimating a weight of an animal such as cattle, a chicken, or a pig.

BACKGROUND ART

Conventionally, as a part of animal health management, a breeder has needed to know weights of animals. As a method of measuring the weight, there is a method of measuring the weight by placing an animal to be measured in a weighing scale or the like.

In addition, when measuring the weight of the animal, a configuration for measuring a size of the animal and estimating the weight is disclosed (see Patent Document 1).

PRIOR ART DOCUMENT

Patent Document

Patent Document 1: Japanese Patent Application Publication No. 2014-044078

SUMMARY OF THE INVENTION

Technical Problem

However, in the configuration of Patent Document 1, it is necessary to acquire three-dimensional size data by a light projector when measuring the size of the animal. In this configuration, when the weight of a large animal is measured in particular, there is a possibility that an apparatus becomes expensive since the apparatus becomes large. Further, in a case where the animal goes on the rampage when the animal is placed on the weighing scale, there is a risk of injuring the animal, a breeder, or a measuring person. Therefore, there is a problem of high cost and safety.

An object of the present invention is to provide an animal weight estimation system, an animal weight estimation method, and a program, for suppressing increase of cost and improving safety when measuring a weight of an animal.

Technical Solution

The present invention provides the following solutions.

An invention according to a first aspect provides an animal weight estimation system for estimating a weight of an animal, the animal weight estimation system including an image capturing unit that captures the animal, an outline data acquiring unit that acquires an outline data of the animal from a captured image which is captured, a distance measuring unit that measures a distance between the animal and an image capturing position at which the animal is captured, and a weight estimating unit that estimates a weight of the animal from the acquired outline data and the measured distance.

According to the first aspect of the invention, an animal weight estimation system for estimating a weight of an animal captures the animal, acquires an outline data of the animal from a captured image which is captured, measures a distance between the animal and an image capturing position at which the animal is captured, and estimates a weight of the animal from the acquired outline data and the measured distance.

The invention according to the first aspect is a category of the animal weight estimation system, but even in other categories such as a method or a program, exhibits the same action and effect corresponding to the category.

An invention according to a second aspect provides an animal weight estimation system for estimating a weight of an animal, the animal weight estimating system including an image capturing unit that captures the animal, a feature amount acquiring unit that acquires a feature amount of the animal from a captured image which is captured, and a weight estimating unit that estimates the weight of the animal form the acquired feature amount.

According to the second aspect of the invention, an animal weight estimation system for estimating a weight of an animal captures the animal, acquires a feature amount of the animal from a captured image which is captured, and estimates the weight of the animal form the acquired feature amount.

The invention according to the second aspect is a category of the animal weight estimation system, but even in other categories such as a method or a program, exhibits the same action and effect corresponding to the category.

An invention according to a third aspect provides an animal weight estimation system which is the invention according to the first or second aspect, wherein the weight estimating unit estimates by referring to a database in which sample data which are acquired in advance are stored.

According to the third aspect of the invention, an animal weight estimation system, which is the invention according to the first or second aspect, estimates by referring to a database in which sample data which are acquired in advance are stored.

An invention according to a fourth aspect provides an animal weight estimation system, which is the invention according to the first or second aspect, further including a temperature measuring unit that measures a temperature of the animal, wherein the weight estimating unit estimates the weight by adding muscle mass or fat mass of the animal from the measured temperature.

According to the fourth aspect of the invention, an animal weight estimation system, which is the invention according to the first or second aspect, measures a temperature of the animal, and estimates the weight by adding muscle mass or fat mass of the animal from the measured temperature.

An invention according to a fifth aspect provides an animal weight estimation system which is the invention according to the first or second aspect, wherein the weight estimating unit creates a 3D model of the animal to estimate the weight.

According to the fifth aspect of the invention, an animal weight estimation system, which is the invention according to the first or second aspect, creates a 3D model of the animal to estimate the weight.

An invention according to a sixth aspect provides an animal weight estimation method of estimating a weight of an animal, the animal weight estimation method including capturing the animal, acquiring an outline data of the animal from a captured image which is captured, measuring a distance between the animal and an image capturing position at which the animal is captured, and estimating a weight of the animal from the acquired outline data and the measured distance.

An invention according to a seventh aspect provides an animal weight estimation method of estimating a weight of an animal, the animal weight estimating method including capturing the animal, acquiring a feature amount of the animal from a captured image which is captured, and estimating the weight of the animal form the acquired feature amount.

An invention according to an eight aspect provides a program causing an animal weight estimation method of estimating a weight of an animal to execute capturing the animal, acquiring an outline data of the animal from a captured image which is captured, measuring a distance between the animal and an image capturing position at which the animal is captured, and estimating a weight of the animal from the acquired outline data and the measured distance.

An invention according to a ninth aspect provides a program causing an animal weight estimation method of estimating a weight of an animal to execute capturing the animal, acquiring a feature amount of the animal from a captured image which is captured, and estimating the weight of the animal form the acquired feature amount.

Effects of the Invention

According to the present invention, it is possible to provide an animal weight estimation system, an animal weight estimation method, and a program, for suppressing increase of cost and improving safety when measuring a weight of an animal.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Animal Weight Estimation System 1

Figure 1:
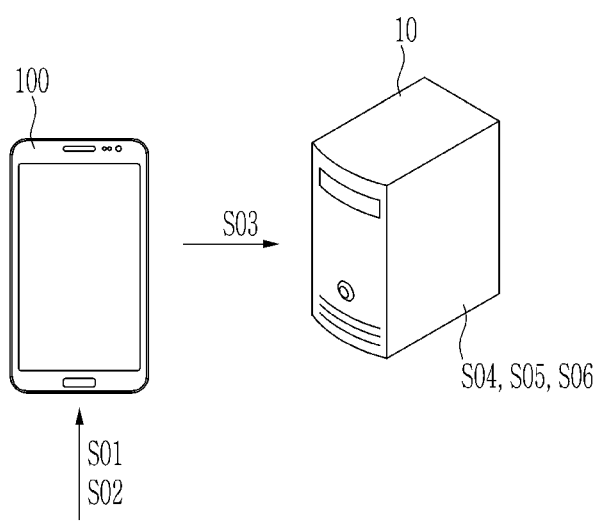
FIG. 1 is a diagram showing an outline of an animal weight estimation system 1.

An overview of a preferred embodiment of the present invention is described with reference to FIG. 1. FIG. 1 is a diagram for explaining an overview of an animal weight estimation system 1 which is a preferred embodiment of the present invention. In FIG. 1, the animal body weight estimation system 1 includes a server 10 and an information terminal 100.

In FIG. 1, the number of information terminal(s) 100 is not limited to one, but may be two or more. Further, the server 10 or the information terminal 100 is not limited to an existing device, but may be a virtual device. Furthermore, each process to be described below may be realized by either of the server 10 or the information terminal 100, or both of them.

The server 10 is a server device capable of performing data communication with the information terminal 100.

The information terminal 100 is a terminal device capable of performing data communication with the server 10. The information terminal 100 is, for example, a mobile phone, a portable information terminal, a tablet terminal, a personal computer, an electric appliance such as a netbook terminal, a slate terminal, an electronic book terminal, or a portable music player, a wearable terminal such as a smart glasses or a head mount display, or other goods.

First, the information terminal 100 captures a captured image of a still image or moving image of an animal such as cattle or a chicken (step S01). In the following description, it is assumed that an animal which is a target to be captured is cattle. Further, the information terminal 100 may be configured to capture thermography showing a thermal distribution image in addition to the captured image. In this case, the information terminal 100 may be configured to acquire the thermography captured by an external device or the like, or may be configured to capture the thermography by an application or the like.

The information terminal 100 measures a distance between the cattle and an image capturing position at which the cattle is captured, by a distance sensor or the like (step S02). Further, the processing in step S02 may be omitted in a case of acquiring a feature amount in step S04 to be described below.

The information terminal 100 transmits a captured image data that is information on the captured image and a distance data that is information on the distance to the server 10 (step S03). In a case of acquiring the feature amount in the processing of step S04 to be described below, the information terminal 100 transmits only the captured image data to the server 10.

The server 10 receives the captured image data. The server 10 analyzes the image of the received captured image data and acquires an outline data or feature amount of the cattle (step S04).

In step S04, when acquiring the outline data, the server 10 estimates a weight of the cattle from the acquired outline data and the measured distance (step S05). In step S05, the server 10 refers to an outline sample DB (database) in which sample data in which outline data and actual weights are associated with each other are stored in advance, thereby extracting an outline data of the sample data which matches or approximates to the acquired outline data, and estimates the weight associated with the extracted data as the weight of the cattle. Further, the server 10 may be configured to improve the estimation accuracy of the weight by adding muscle mass or fat mass, which is determined based on thermal distribution of the thermography, to the estimated weight. Furthermore, the server 10 may be configured to create a 3D model and estimate the weight based on a 3D model of sample data stored in a 3D model sample DB and the 3D model created based on the acquired outline data.

Further, in a case of acquiring the feature amount in step S04, the server 10 estimates the weight of the animal from the acquired feature amount (step S06). In step S06, the server 10 refers to a feature amount sample DB in which sample data in which feature amounts and actual weights are associated with each other are stored in advance, thereby extracting a feature amount of the sample data which matches or approximates to the acquired feature amount, and estimates the weight associated with the extracted data as the weight of the cattle. Further, the server 10 may be configured to improve the estimation accuracy of the weight by adding muscle mass or fat mass, which is determined based on thermal distribution of the thermography, to the estimated weight. Furthermore, the server 10 may be configured to create a 3D model and estimate the weight based on a 3D model of sample data stored in a 3D model sample DB and the 3D model created based on the acquired feature amount.

The above is the overview of the animal weight estimation system 1.

System Configuration of Animal Weight Estimation System 1

Figure 2:
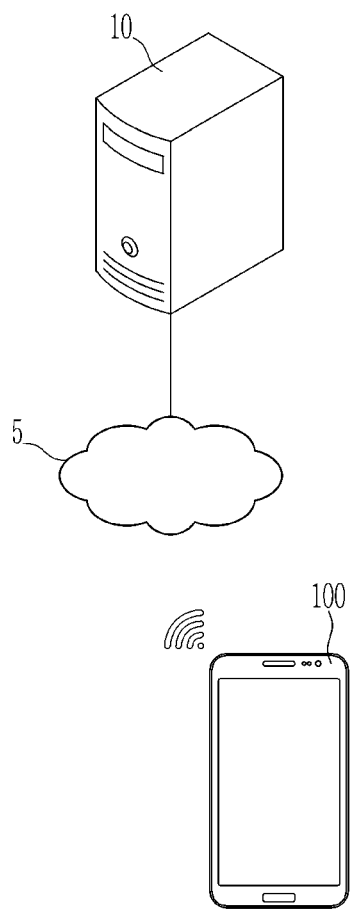
FIG. 2 is an overall configuration diagram of an animal weight estimation system 1.

A system configuration of an animal weight estimation system 1, which is a preferred embodiment of the present invention, is described with reference to FIG. 2. FIG. 2 is a diagram showing a system configuration of an animal weight estimation system 1 which is a preferred embodiment of the present invention. The animal weight estimation system 1 includes a server 10, an information terminal 100, and a public line network (Internet network, third or fourth generation communication network, or the like) 5. Besides, the number of the information terminal(s) 100 is not limited to one, and may be two or more. Further, the server 10 or the information terminal 100 may be realized by either of an existing device or a virtual device, or both of them. Furthermore, each process to be described below may be realized by either of the server 10 or the information terminal 100, or both of them.

The server 10 is the above-described server device having functions to be described below.

The information terminal 100 is the above-described terminal device having functions to be described below.

Description of Each Function

Figure 3:
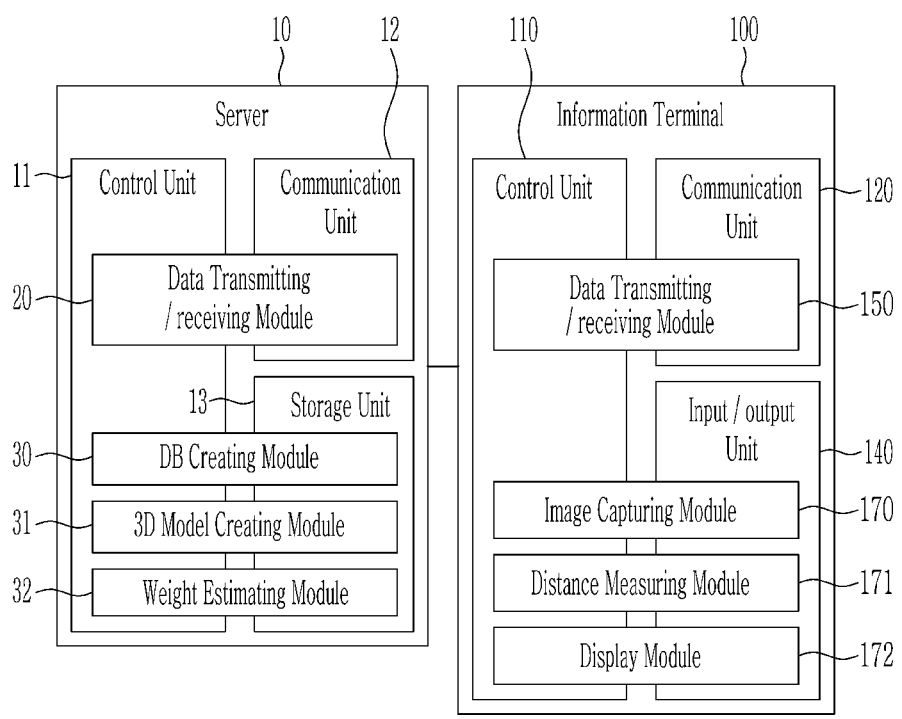
FIG. 3 is a functional block diagram of a server 10 and an information terminal 100.

Functions of an animal weight estimation system 1 which is a preferred embodiment of the present invention are described with reference to FIG. 3. FIG. 3 is a functional block diagram of a server 10 and an information terminal 100.

The server 10 includes, as a control unit 11, a CPU (Central Processing Unit), a RAM (Random Access Memory), a ROM (Read Only Memory), and the like, and includes, as a communication unit 12, a device for enabling communication with other devices, for example, WiFi (Wireless Fidelity) compliant device conforming to IEEE 802.11. In addition, the server 10 includes, as a storage unit 13, a data storage unit, such as a hard disk, a semiconductor memory, a recording medium, a memory card, or the like. In the storage unit 13, various DBs to be described below are stored.

In the server 10, the control unit 11 reads a predetermined program, thereby realizing a data transmitting/receiving module 20 in cooperation with the communication unit 12.

In the server 10, the control unit 11 reads a predetermined program, thereby realizing a DB creating module 30, a 3D model creating module 31, and a weight estimating module 32 in cooperation with the storage unit 13.

Like the server 10, the information terminal 100 includes, as a control unit 110, a CPU, a RAM, a ROM, and the like, and includes, as a communication unit 120, a WiFi-compliant device or the like for enabling communication with other devices. Further, the information terminal 100 includes, as an input/output unit 140, a display unit for outputting and displaying data and images controlled by the control unit 110, an input unit such as a touch panel, a keyboard, or a mouse, for accepting an input from a user, a distance measuring device for measuring a distance to a target with a distance sensor or the like, a temperature measuring device for measuring temperature distribution of the target, and the like.

In the information terminal 100, the control unit 110 reads a predetermined program, thereby realizing a data transmitting/receiving module 150 in cooperation with the communication unit 120. In addition, in the information terminal 100, the control unit 110 reads a predetermined program, thereby realizing an image capturing module 170, a distance measuring module 171, and a display module 172 in cooperation with the input/output unit 140.

Outline Sample DB Creating Process

Figure 4:
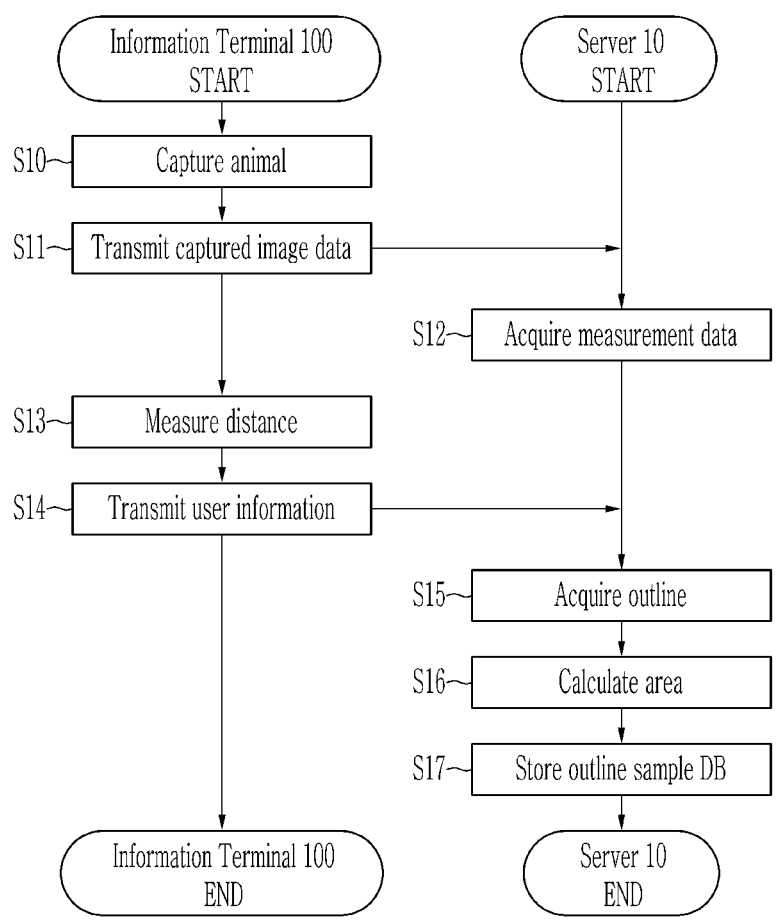
FIG. 4 is a diagram showing an outline sample DB creating process executed by a server 10 and an information terminal 100.

An outline sample DB creating process executed by an animal weight estimation system 1 is described with reference to FIG. 4. FIG. 4 is a diagram showing a flowchart of an outline sample DB creating process executed by a server 10 and an information terminal 100. The processing executed by the above-described modules of each device is described together with this processing.

First, an image capturing module 170 captures an animal by its own image capturing device such as a camera (step S10). In the present embodiment, it is assumed that the image capturing module 170 captures cattle. An animal to be captured is not limited to the cattle, but may be various animals such as a chicken and a pig.

A data transmitting/receiving module 150 transmits a captured image data that is information on a captured image which is captured to the server 10 (step S11).

A data transmitting/receiving module 20 receives the captured image data.

The data transmitting/receiving module 20 acquires a measurement data which is information on a weight of the captured animal which is actually measured by a weighing scale (step S12). In step S12, the data transmitting/receiving module 20 acquires information on the weight of the cattle captured in step S10, which is measured by a weighting scale connected for data communication. In step S12, the information terminal 100 may be configured to accept an input of a measurement data of the captured cattle and transmit the accepted measurement data to the server so that the data transmitting/receiving module 20 acquires the measurement data. In addition, the data transmitting/receiving module 20 may be configured to acquire the measurement data of the cattle by other configurations.

A distance measuring module 171 measures a distance between the captured cattle and an image capturing position at which the cattle is captured (step S13). In step S13, the distance measuring module 171 measures the distance by its own distance sensor. In step S13, the distance measuring module 171 may measure the distance by other configurations.

The data transmitting/receiving module 150 transmits a distance data which is information on the measured distance to the server 10 (step S14). Further, the processing in step S13 and step S14 may be executed at the same time as the processing in step S10 and step S11. For example, when the image capturing module 170 captures the cattle, the distance measuring module 171 measures the distance. Furthermore, in step S11, the data transmitting/receiving module 150 may transmit the distance data in addition to the captured image data.

A DB creating module 30 acquires an outline of the cattle shown in the captured image data (step S15). The DB creating module 30 acquires the outline of the cattle by image recognition on the captured image data. The outline is, for example, obtained by shaping a rough shape of the cattle.

The DB creating module 30 calculates an area of the captured cattle based on the acquired outline of the cattle and the distance data (step S16). The DB creating module 30 calculates an area of the outline of the cattle from the acquired outline of the cattle. The DB creating module 30 calculates the area of the captured cattle based on the calculated area of the outline of the cattle and the distance data.

The DB creating module 30 creates and stores an outline sample DB in which the calculated area of the cattle and the measurement data of the cattle are associated with each other (step S17). The DB creating module 30 may be configured to create and store the outline sample DB by associating the measurement data of cattle with the acquired outline instead of the calculated area.

The information terminal 100 executes the outline sample DB creating process on a sufficient number of cattle, for example, about 100 cattle, and then creates the outline sample DB. The contour sample DB is not limited to the above-mentioned number of samples, and may have the more or less samples than the above-mentioned number of samples. The more the number is, the more accuracy can be improved at the time of weight estimation to be described below.

The above is the outline sample DB creating process.

Feature Amount Sample DB Creating Process

Figure 5:
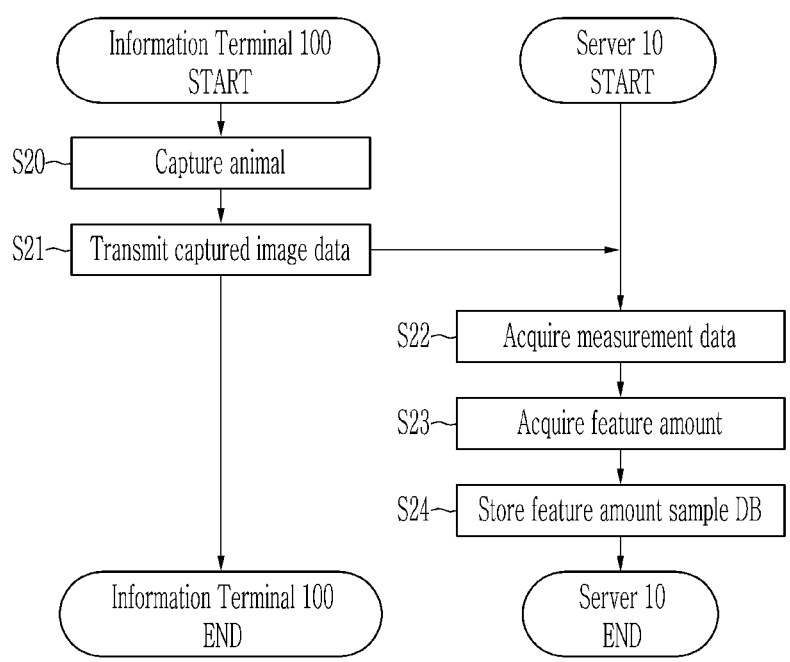
FIG. 5 is a diagram showing a feature amount sample DB creating process executed by a server 10 and an information terminal 100.

Next, a feature amount sample DB creating process executed by an animal weight estimation system 1 is described with reference to FIG. 5. FIG. 5 is a diagram showing a flowchart of a feature amount sample DB creating process executed by a server 10 and an information terminal 100. The processing executed by the above-described modules of each device is described together with this processing.

The server 10 and the information terminal 100 execute the same processing as the above-described steps S10 to S12 (steps S20 to S22).

A DB creating module 30 acquires a feature amount of cattle shown in the captured image data (step S23). In step S23, the DB creating module 30 extracts the feature amount of the cattle by image recognition on the captured image data. The feature amount is, for example, a physical feature, each part, or the like.

The DB creating module 30 creates and stores a feature amount sample DB in which the acquired feature amount of the cattle is associated with a measurement data of the cattle (step S24). In step S24, the DB creating module 30 collects all of features amounts of the cattle as one feature amount, and associates the collected feature amount with the measurement data. Further, the DB creating module 30 may be configured to associate individual feature amounts with the measurement data.

The information terminal 100 executes the feature amount sample DB creating process on a sufficient number of cattle, for example, about 100 cattle and then creates the feature amount sample DB. Further, the feature amount sample DB is not limited to the above-mentioned number of samples, and may have the more or less samples than the above-mentioned number of samples. The more the number is, the more accuracy can be improved at the time of weight estimation to be described below.

The above is the feature amount sample DB creating process.

3D Model Sample DB Creating Process

Figure 6:
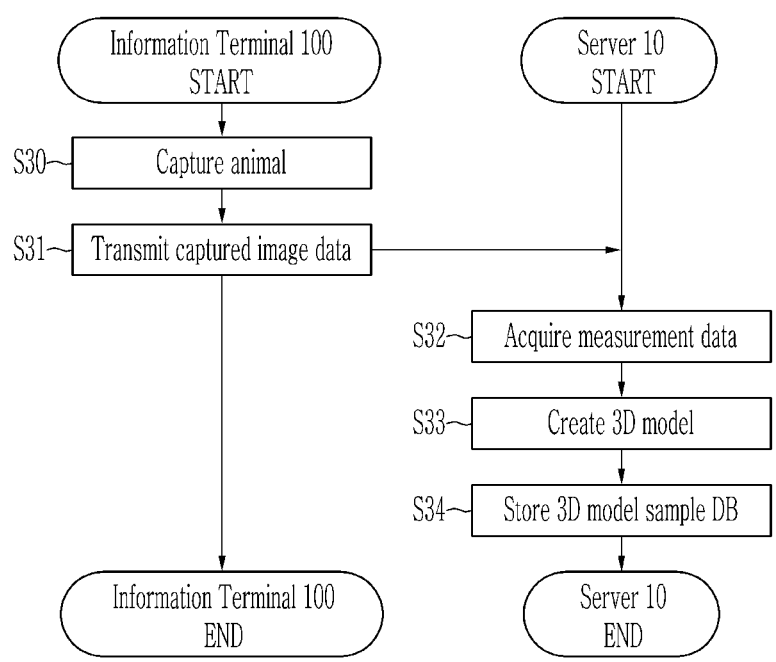
FIG. 6 is a diagram showing a 3D model sample DB creating processing executed by a server 10 and an information terminal 100.

Next, a 3D model sample DB creating process executed by an animal weight estimation system 1 is described with reference to FIG. 6. FIG. 6 is a diagram showing a flowchart of a 3D model sample DB creating process executed by a server 10 and an information terminal 100. The processing executed by the above-described modules of each device is described together with this processing.

The server 10 and the information terminal 100 execute the same processing as the above-described steps S10 to S12 (steps S30 to S32).

The 3D model creating module 31 performs image recognition on a captured image data and creates a 3D model of the cattle included in the captured image data (step S33). In step S33, the 3D model creating module 31 converts the image of the cattle into a 3D data and creates the 3D model.

The DB creating module 30 creates and stores a 3D model sample DB in which the created 3D model of the cattle and a measurement data of the cattle are associated with each other (step S34).

The information terminal 100 executes the 3D model sample DB creating process on a sufficient number of cattle, for example, around 100 cattle and then creates the 3D model sample DB. Further, the 3D model sample DB is not limited to the above-mentioned number of samples, and may have the more or less samples than the above-mentioned number of samples. The more the number is, the more accuracy can be improved at the time of weight estimation to be described below.

The above is the 3D model sample DB creating process.

First Animal Weight Estimating Process

Figure 7:
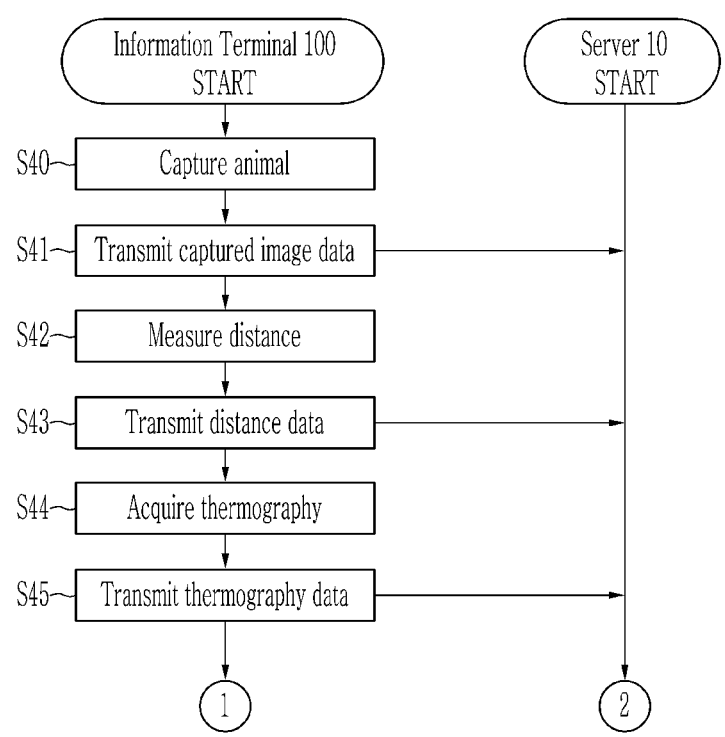
FIG. 7 is a diagram showing a first animal weight estimating process executed by a server 10 and an information terminal 100.
Figure 8:
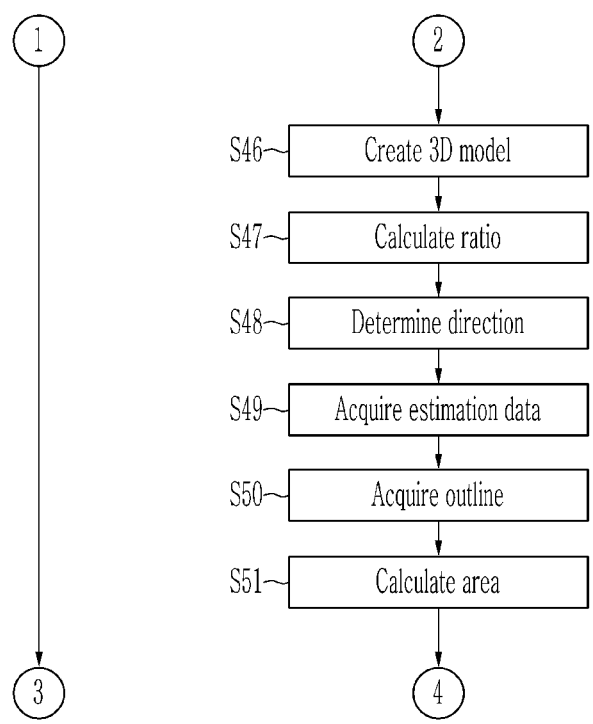
FIG. 8 is a diagram showing a first animal weight estimating process executed by a server 10 and an information terminal 100.
Figure 9:
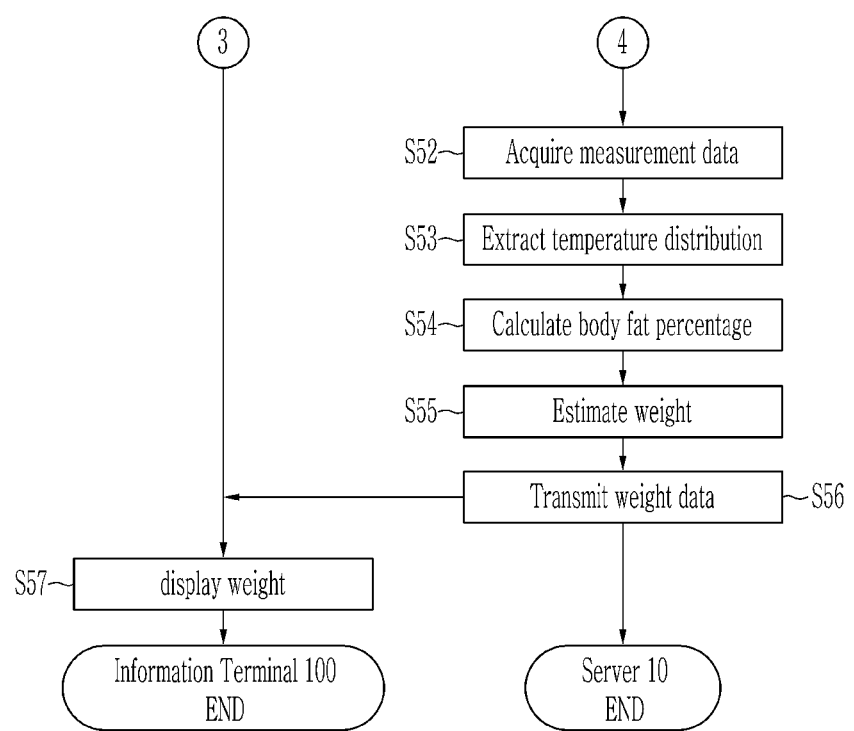
FIG. 9 is a diagram showing a first animal weight estimating process executed by a server 10 and an information terminal 100.

A first animal weight estimating process based on an outline, executed by an animal weight estimation system 1, is described with reference to FIG. 7 to FIG. 9. FIG. 7 to FIG. 9 are flowcharts showing a first animal weight estimating process executed by a server 10 and an information terminal 100. The processing executed by the above-described modules of each device is described together with this processing.

First, an image capturing module 170 captures an image of an animal (step S40). The processing in step S40 is the same as the processing in step S10 described above.

A data transmitting/receiving module 150 transmits a captured image data to the server 10 (step S41). The processing in step S41 is the same as the processing step S11 described above.

A data transmitting/receiving module 20 receives the captured image data.

A distance measuring module 171 measures a distance between the captured cattle and an image capturing position at which the cattle is captured (step S42). The processing in step S42 is the same as the processing in step S13 described above.

The data transmitting/receiving module 150 transmits a distance data to the server 10 (step S43). The processing in step S43 is the same as the processing in step S14 described above. Further, the processing in step S42 and step S43 may be executed at the same time as the processing in step S40 and step S41 described above. For example, when the image capturing module 170 captures the cattle, the distance measuring module 171 measures the distance. The data transmitting/receiving module 150 may be configured to transmit the distance data in addition to the captured image data.

An image capturing module 170 acquires thermography of the cattle (step S44). In step S44, the information terminal 100 captures the cattle by a dedicated application thereby acquiring the thermography of the cattle, or wired or wirelessly connects a device that captures the thermography thereby acquiring the thermography of the cattle, which is captured by this device.

The data transmitting/receiving module 150 transmits a thermography data which is information on thermography to the server 10 (step S45). Further, the processing in step S44 and step S45 may be executed at the same time as the processing in step S40 and step S41, similarly to acquisition and transmission of the distance data described above. For example, when capturing the cattle, the image capturing module 170 also acquires the thermography of the cattle. The data transmitting/receiving module 150 may be configured to transmit the thermography data in addition to the captured image data. Furthermore, the order of the processing in step S42 and step S43 and the processing of step S44 and step S45 may be interchanged.

The data transmitting/receiving module 20 receives the thermography data.

A 3D model creating module 31 performs image recognition on the captured image data and creates a 3D model of the cattle included in the captured image data (step S46). The processing in step S46 is the same as the processing in step S33 described above.

A weight estimating module 32 calculates a ratio of predetermined parts based on the created 3D model (step S47). In step S47, the weight estimating module 32 calculates a ratio of a distance from an ear to a nose and a distance from the nose to a torso, a ratio of a distance from a front leg to a back leg, a length of the front leg, and a length of the back leg, or the like.

The weight estimating module 32 determines a direction in which the cattle is facing based on the calculated ratio (step S48). In step S48, the weight estimating module 32 determines which direction the cattle is facing in, based on ratios of parts in predetermined directions such as forward, backward, front, and the like which are stored in advance and the calculated ratio. Further, the weight estimating module 32 may determine the direction in which the cattle is facing according to other configurations.

The weight estimating module 32 compares the determined direction and the created 3D model with 3D models of cattle stored in a 3D model sample DB, and acquires an estimation data of the weight of the cattle associated with this 3D model (step S49). In step S49, the weight estimating module 32 extracts a 3D model stored in the 3D model sample DB, which approximates to or matches the created 3D model. Approximation means, for example, that it is within an error number [%] or the like.

The weight estimating module 32 acquires the measurement data of the weight associated with the extracted 3D model. In this way, the weight estimating module 32 estimates the weight of the cattle from the created 3D model of the cattle.

Further, the above-described processing in steps S46 to S49 may not be necessarily executed. In this case, any configuration may be employed as long as this processing is omitted and the subsequent processing is executed.

The weight estimating module 32 acquires an outline of the cattle in the captured image data (step S50). The processing in step S50 is the same as the above-described processing in step S15 except that the weight estimating module 32 executes the processing.

The weight estimating module 32 calculates an area of the cattle based on the acquired outline of the cattle and the distance data (step S51). The processing in step S51 is the same as the above-described processing step S16 except that the weight estimating module 32 executes the processing.

The weight estimating module 32 compares the calculated area of the cattle with areas of the cattle stored in the outline sample DB, and acquires a measurement data of the weight of the cattle associated with this area (step S52). In step S52, the weight estimating module 32 extracts an area stored in the outline sample DB, which approximates to or matches the calculated area of the cattle. Approximation means, for example, that it is within an error number [%] or the like. The weight estimating module 32 acquires the measurement data of the weight associated with the extracted area. In this way, the weight estimating module 32 estimates the weight of the cattle from the calculated area of the cattle.

The weight estimating module 32 may acquire the measurement data of the weight of the cattle from the outline of the cattle, instead of acquiring the measurement data of the weight of the cattle from the area of the cattle. In this case, outline data of the cattle may be stored in an outline sample DB, and the measurement data of the weight may be associated with the outline data. The weight estimating module 32 compares the extracted outline of the cattle with the outline data stored in the outline sample DB, and extracts an outline data stored in the outline sample DB, which matches or approximates to the outline of the cattle. The weight estimating module 32 may be configured to acquire an estimation data of the weight associated with the extracted outline data.

The weight estimating module 32 extracts temperature distribution of the cattle based on the thermography data (step S53).

The weight estimating module 32 determines muscle mass and fat mass at each part or the whole body of the cattle based on the extracted temperature distribution, and calculates a body fat percentage (step S54). Because there is a temperature difference between muscle and fat, it is possible to determine amounts of muscle and fat based on criteria such as whether or not it is below a predetermined temperature.

Further, the processing in step S53 and step S54 may not be necessarily executed. In this case, any configuration may be employed as long as this processing is omitted and the subsequent processing is executed.

The weight estimating module 32 estimates the weight of the cattle by adding the calculated body fat percentage to the measurement data of the weight acquired from the 3D model and the measurement data of the weight acquired from the outline (step S55). In step S55, the weight estimating module 32 estimates the weight of the cattle by adding the body fat percentage to an average value or the like of the measurement data of the weight acquired from the 3D model and the measurement data of the weight acquired from the outline. The weight estimating module 32 can improve the accuracy of estimating the weight of the cattle by adding the body fat percentage. In step S55, the weight estimating module 32 may be configured to estimate the weight by adding either the muscle mass or the fat mass or both of them, instead of the body fat percentage, to the measurement data. In this case, for example, the muscle mass and the fat amount may be calculated, respectively, and the calculated muscle mass and fat mass may be added to the measurement data. Further, other configurations may be employed.

Further, in step S55, when the processing related to the 3D model or the body fat percentage is omitted, the weight estimating module 32 may execute the processing in which corresponding information is deleted. For example, when the processing relating to the 3D model is omitted, the weight estimating module 32 may be configured to estimate the weight of the cattle by adding the calculated body fat percentage to the measurement data of the weight acquired from the outline. When the processing related to the body fat percentage is omitted, the weight estimating module 32 may be configured to estimate the weight of the cattle based on the measurement data of the weight acquired from the 3D model and the measurement data of the weight acquired from the outline. In addition, when the processing related to the 3D model and the body fat percentage is omitted, the weight estimating module 32 may be configured to estimate the measurement data of the weight acquired from the outline as the weight of the cattle.

The data transmitting/receiving module 20 transmits a weight data which is the estimated weight to the information terminal 100 (step S56).

The data transmitting/receiving module 150 receives the weight data. A display module 172 displays the weight of the cattle based on the weight data (step S57). In step S57, the display module 172 displays the captured image and also displays the weight of the cattle based on the weight data in a region overlapped with the captured image or a region different from a region displaying the captured image.

The above is the first animal weight estimating process.

Second Animal Weight Estimating Process

Figure 10:
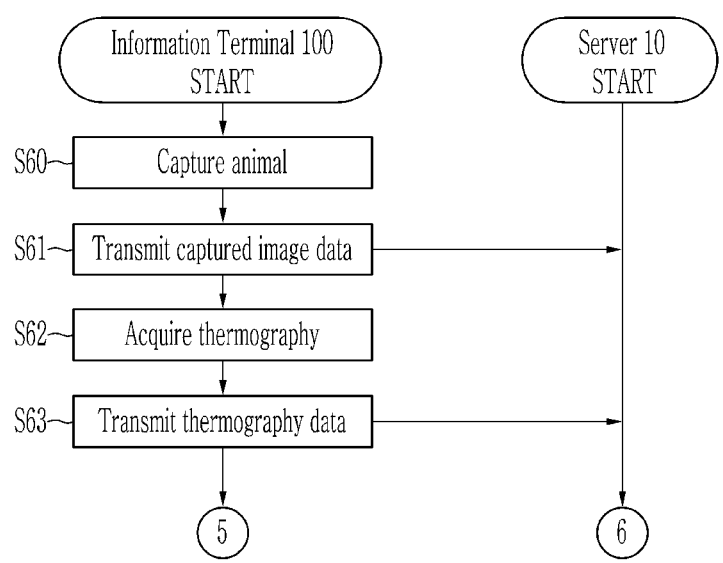
FIG. 10 is a diagram showing a second animal weight estimating process executed by a server 10 and an information terminal 100.
Figure 11:
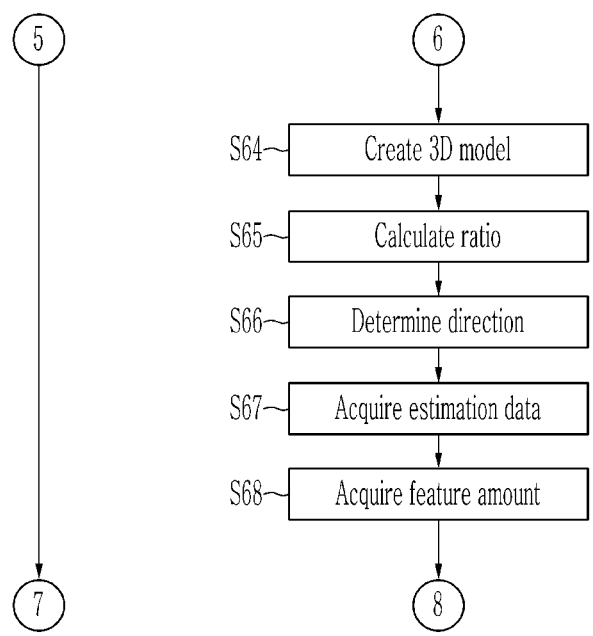
FIG. 11 is a diagram showing a second animal weight estimating process executed by a server 10 and an information terminal 100.
Figure 12:
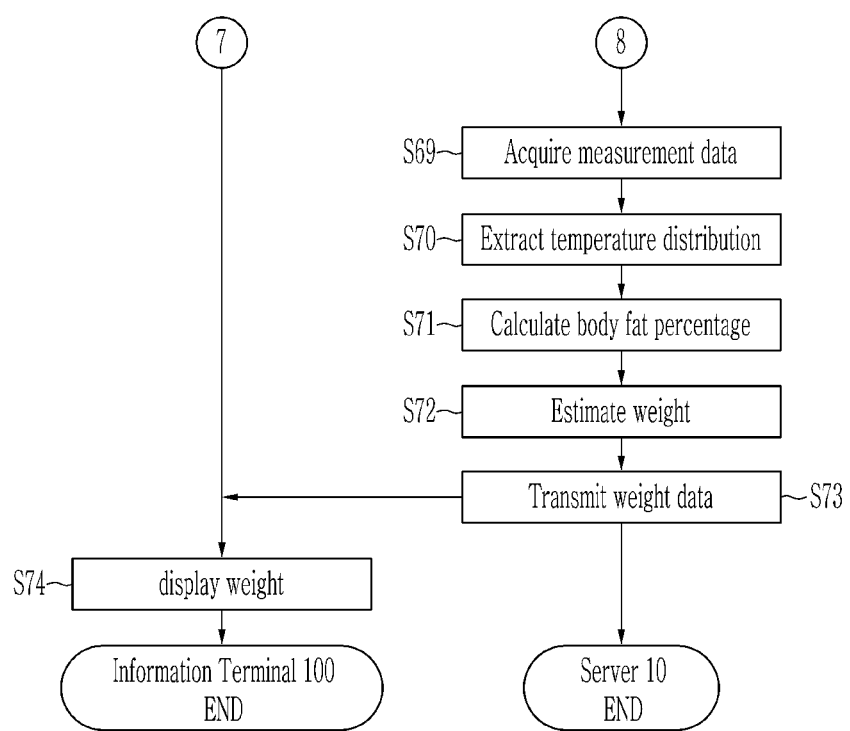
FIG. 12 is a diagram showing a second animal weight estimating process executed by a server 10 and an information terminal 100.

Next, a second animal body weight estimating process based on a feature amount executed by an animal weight estimation system 1 is described with reference to FIG. 10 to FIG. 12. FIG. 10 to FIG. 12 are flowcharts showing a second animal weight estimating process executed by a server 10 and an information terminal 100. The processing executed by the above-described modules of each device is described together with this processing.

An image capturing module 170 captures an animal (step S60). The processing in step S60 is the same as the processing in step S10 described above.

A data transmitting/receiving module 150 transmits a captured image data to the server 10 (step S61). The processing in step S61 is the same as the processing in step S11 described above.

A data transmitting/receiving module 20 receives the captured image data.

The image capturing module 170 acquires thermography of the cattle (step S62). The processing in step S62 is the same as the processing in step S44 described above.

The data transmitting/receiving module 150 transmits a thermography data to the server 10 (step S63). The processing in step S63 is the same as the processing in step S45 described above. Further, the processing in step S62 and step S63 may be executed at the same time as the processing in step S60 and step S61 described above. For example, when capturing the cattle, the image capturing module 170 also acquires the thermography of the cattle. The data transmitting/receiving module 150 may be configured to transmit the thermography data in addition to the captured image data.

The data transmitting/receiving module 20 receives the thermography data.

A 3D model creating module 31 performs image recognition on the captured image data and creates a 3D model of the cattle included in the captured image data (step S64). The processing in step S64 is the same as the processing in step S33 described above.

A weight estimating module 32 calculates a ratio of predetermined parts based on the created 3D model (step S65). The processing in step S65 is the same as the processing in step S47 described above.

The weight estimating module 32 determines a direction in which the cattle is facing based on the calculated ratio (step S66). The processing in step S66 is the same as the processing in step S48 described above.

The weight estimating module 32 compares the determined direction and the created 3D model with 3D models of cattle stored in a 3D model sample DB, and acquires an estimation data of the weight of the cattle associated with this 3D model (step S67). The processing in step S67 is the same as the processing in step S49 described above.

Further, the processing in steps S64 to S67 described above may not be necessarily executed. In this case, any configuration may be employed as long as this processing is omitted and the subsequent processing is executed.

The weight estimating module 32 acquires a feature amount of the cattle shown in the captured image data (step S68). The processing in step S68 is the same as the above-described processing in step S23 except that the weight estimating module 32 executes the processing.

The weight estimating module 32 compares the acquired feature amount of the cattle with feature amounts of cattle stored in a feature amount sample DB, and acquires a measurement data of the weight of the cattle associated with the feature amount (step S69). In step S69, the weight estimating module 32 extracts the feature amount stored in the feature amount sample DB, which approximates to or matches the acquired feature amount of the cattle. Approximation means, for example, that it is within an error number [%] or the like. The weight estimating module 32 acquires the measurement data of the weight associated with the extracted feature amount. In this way, the weight estimating module 32 estimates the weight of the cattle from the extracted feature amount.

The weight estimating module 32 extracts temperature distribution of the cattle based on the thermography data (step S70). The processing in step S70 is the same as the processing in step S53 described above.

The weight estimating module 32 determines muscle mass and fat mass at each part or the whole body of the cattle based on the extracted temperature distribution, and calculates a body fat percentage (step S71). The processing in step S71 is the same as the processing in step S54 described above.

Further, the processing in step S70 and step S71 may not be necessarily executed. In this case, any configuration may be employed as long as this processing is omitted and the subsequent processing is executed.

The weight estimating module 32 estimates the weight of the cattle by adding the calculated body fat percentage to the measurement data of the weight acquired from the 3D model and the measurement data of the weight acquired from the feature amount (step S72). In step S72, the weight estimating module 32 estimates the weight of the cow by adding the body fat percentage to an average value or the like of the measurement data of the weight acquired from the 3D model and the measurement data of the weight acquired from the feature amount. The weight estimating module 32 can improve the accuracy of estimating the weight of the cattle by adding the body fat percentage. In step S72, the weight estimating module 32 may be configured to estimate the weight by adding either the muscle mass or the fat amount or both of them, instead of the body fat percentage, to the measurement data. In this case, the muscle mass and the fat amount may be calculated, respectively, and the calculated muscle mass and fat mass may be added to the measurement data. Further, other configurations may be employed.

Further, in step S72, when the processing related to the 3D model or the body fat percentage is omitted, the weight estimating module 32 may execute the processing in which corresponding information is deleted. For example, when the processing relating to the 3D model is omitted, the weight estimating module 32 may be configured to estimate the weight of the cattle by adding the calculated body fat percentage to the measurement data of the weight acquired from the feature amount. When the processing related to the body fat percentage is omitted, the weight estimating module 32 may be configured to estimate the weight of the cattle based on the measurement data of the weight acquired from the 3D model and the measurement data of the weight acquired from the feature amount. In addition, when the processing related to the 3D model and the body fat percentage is omitted, the weight estimating module 32 may be configured to estimate the measurement data of the weight acquired from the feature amount as the weight of the cattle.

The data transmitting/receiving module 20 transmits a weight data to the information terminal 100 (step S73). The processing in step S73 is the same as the processing in step S56 described above.

The data transmitting/receiving module 150 receives the weight data. The display module 172 displays the weight of the cattle based on the weight data (step S74). The processing in step S74 is the same as the processing in step S57 described above.

The above is the second animal weight estimating process.

Each of the above-described processes is executed by the server 10 and the information terminal 100, but may be executed only by the information terminal 100. In this case, the information terminal 100 may execute the processing executed by the server 10.

The means and functions described above are realized by reading and executing a predetermined program by a computer (including a CPU, an information processing device, or various terminals). The program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit so as to be stored and executed. Furthermore, the program may be, for example, recorded in a storage device (recording medium) such as a magnetic disk, an optical disk, an optical magnetic disk, or the like in advance and be provided from the recording medium to the computer via communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: animal weight estimation system, 10: server, 100: information terminal

What is claimed is:

1. An animal weight estimation system for estimating a weight of an animal, the animal weight estimation system comprising:
   a first database in which relationships between areas of sample animals and actual values of weights of the sample animals are stored in advance;
   a second database in which relationships between three-dimensional (3D) models of sample animals and the actual values of weights of the sample animals are stored in advance;
   an image capturing unit that captures a target animal whose weight is to be measured;
   an outline data acquiring unit that acquires an outline data of the target animal from a captured image which is captured;
   a distance measuring unit that measures a distance between the target animal and an image capturing position at which the target animal is captured;
   a calculating unit that calculates an area of the target animal from the acquired outline data and the measured distance;
   a 3D model creating unit that creates a 3D model of the target animal from the captured image; and
   a weight estimating unit that extracts a first sample animal whose area is approximate to the area of the target animal from the first database, determines a direction in which the target animal is facing based on the 3D model of the target animal, extracts a second sample animal having a 3D model corresponding to the direction and the 3D model of the target animal from the second database, and estimates a weight of the target animal based on an actual value of a weight of the first sample animal, which is stored in the first database in advance, and an actual value of a weight of the second sample animal, which is stored in the second database in advance,
   wherein the weight estimating unit calculates a ratio of distances between predetermined parts or lengths of predetermined parts based on the 3D model of the target animal, and determines the direction based on the ratio.

2. The animal weight estimation system according to claim 1, further comprising a temperature measuring unit that measures a temperature of the animal,
   wherein the weight estimating unit estimates the weight by adding muscle mass or fat mass of the animal from the measured temperature.

3. An animal weight estimation system for estimating a weight of an animal, the animal weight estimating system comprising:
   a first database in which relationships between feature amounts of sample animals and actual values of weights of the sample animals are stored in advance, the feature amounts being acquired by performing image recognition on the sample animals which are captured in advance;
   a second database in which relationships between 3D models of sample animals and the actual values of weights of the sample animals are stored in advance;
   an image capturing unit that captures a target animal whose weight is to be measured;
   a feature amount acquiring unit that acquires a feature amount of the target animal from a captured image which is captured;
   a 3D model creating unit that creates a 3D model of the target animal from the captured image; and a weight estimating unit that extracts a first sample animal whose feature amount is approximate to the feature amount of the target animal from the first database, determines a direction in which the target animal is facing based on the 3D model of the target animal, extracts a second sample animal having a 3D model corresponding to the direction and the 3D model of the target animal from the second database, and estimates a weight of the target animal based on an actual value of a weight of the first sample animal, which is stored in the first database in advance, and an actual value of a weight of the second sample animal, which is stored in the second database in advance, wherein the weight estimating unit calculates a ratio of distances between predetermined parts or lengths of predetermined parts based on the 3D model of the target animal, and determines the direction based on the ratio.

4. The animal weight estimation system according to claim 3, further comprising a temperature measuring unit that measures a temperature of the animal, wherein the weight estimating unit estimates the weight by adding muscle mass or fat mass of the animal from the measured temperature.

5. An animal weight estimation method of estimating a weight of an animal, the animal weight estimation method comprising:

capturing a target animal whose weight is to be measured;

acquiring an outline data of the target animal from a captured image which is captured;

measuring a distance between the target animal and an image capturing position at which the target animal is captured;

calculating an area of the target animal from the acquired outline data and the measured distance;

extracting a first sample animal whose area is approximate to the area of the target animal from a first database in which relationships between areas of sample animals and actual values of weights of the sample animals are stored in advance;

creating a 3D model of the target animal from the captured image;

determining a direction in which the target animal is facing based on the 3D model of the target animal;

extracting a second sample animal having a 3D model corresponding to the direction and the 3D model of the target animal from a second database in which relationships between three-dimensional (3D) models of sample animals and the actual values of weights of the sample animals are stored in advance; and estimating a weight of the target animal based on an actual value of a weight of the first sample animal, which is stored in the first database in advance, and an actual value of a weight of the second sample animal, which is stored in the second database in advance, wherein determining the direction includes calculating a ratio of distances between predetermined parts or lengths of predetermined parts based on the 3D model of the target animal, and determining the direction based on the ratio.

6. An animal weight estimation method of estimating a weight of an animal, the animal weight estimating method comprising:

capturing a target animal whose weight is to be measured;

acquiring a feature amount of the target animal from a captured image which is captured;

extracting a first sample animal whose feature amount is approximate to the feature amount of the target animal from a first database in which relationships between feature amounts of sample animals and actual values of weights of the sample animals are stored in advance, the feature amounts being acquired by performing image recognition on the sample animals which are captured in advance;

creating a 3D model of the target animal from the captured image;

determining a direction in which the target animal is facing based on the 3D model of the target animal;

extracting a second sample animal having a 3D model corresponding to the direction and the 3D model of the target animal from a second database in which relationships between three-dimensional (3D) models of sample animals and the actual values of weights of the sample animals are stored in advance; and estimating a weight of the target animal based on an actual value of a weight of the first sample animal, which is stored in the first database in advance, and an actual value of a weight of the second sample animal, which is stored in the second database in advance, wherein determining the direction includes calculating a ratio of distances between predetermined parts or lengths of predetermined parts based on the 3D model of the target animal, and determining the direction based on the ratio.

7. A non-transitory computer-readable storage medium that stores a program causing a computing device to execute:

capturing a target animal whose weight is to be measured;

acquiring an outline data of the target animal from a captured image which is captured;

measuring a distance between the target animal and an image capturing position at which the target animal is captured;

calculating an area of the target animal from the acquired outline data and the measured distance;

extracting a first sample animal whose area is approximate to the area of the target animal from a first database in which relationships between areas of sample animals and actual values of weights of the sample animals are stored in advance;

creating a 3D model of the target animal from the captured image;

determining a direction in which the target animal is facing based on the 3D model of the target animal;

extracting a second sample animal having a 3D model corresponding to the direction and the 3D model of the target animal from a second database in which relationships between three-dimensional (3D) models of sample animals and the actual values of weights of the sample animals are stored in advance; and estimating a weight of the target animal based on an actual value of a weight of the first sample animal, which is stored in the first database in advance, and an actual value of a weight of the second sample animal, which is stored in the second database in advance, wherein determining the direction includes calculating a ratio of distances between predetermined parts or length of predetermined parts based on the 3D model of the target animal, and determining the direction based on the ratio.

8. A non-transitory computer-readable storage medium that stores a program causing a computing device to execute:

capturing a target animal whose weight is to be measured;

acquiring a feature amount of the target animal from a captured image which is captured;

extracting a first sample animal whose feature amount is approximate to the feature amount of the target animal from a first database in which relationships between feature amounts of sample animals and actual values of weights of the sample animals are stored in advance, the feature amounts being acquired by performing image recognition on the sample animals which are captured in advance;

creating a 3D model of the target animal from the captured image;

determining a direction in which the target animal is facing based on the 3D model of the target animal;

extracting a second sample animal having a 3D model corresponding to the direction and the 3D model of the target animal from a second database in which relationships between three-dimensional (3D) models of sample animals and the actual values of weights of the sample animals are stored in advance; and estimating a weight of the target animal based on an actual value of a weight of the first sample animal, which is stored in the first database in advance, and an actual value of a weight of the second sample animal, which is stored in the second database in advance, wherein determining the direction includes calculating a ratio of distances between predetermined parts or lengths of predetermined parts based on the 3D model of the target animal, and determining the direction based on the ratio.

* * * * *